(12) United States Patent  
Li et al.

(10) Patent No.: US 8,041,597 B2  
(45) Date of Patent: Oct. 18, 2011

(54) SELF-CALIBRATING OUTLIER MODEL AND ADAPTIVE CASCADE MODEL FOR FRAUD DETECTION

(75) Inventors: Xiang Li, San Diego, CA (US); Scott M. Zoldi, San Diego, CA (US); Jehangir Athwal, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 465 days.

(21) Appl. No.: 12/189,023

(22) Filed: Aug. 8, 2008

(65) Prior Publication Data

US 2010/0036672 A1 Feb. 11, 2010

(51) Int. Cl.
*G06Q 10/00* (2006.01)
*G06Q 30/00* (2006.01)
*G06F 7/04* (2006.01)
*G06F 17/30* (2006.01)
*H04N 7/16* (2011.01)

(52) U.S. Cl. ............... 705/7.38; 705/7.11; 705/7.39; 705/14.47; 726/30

(58) Field of Classification Search ......... 705/7.11–7.42
See application file for complete search history.

(56) References Cited

U.S. PATENT DOCUMENTS

| | | | |
|---|---|---|---|
| 6,601,048 B1* | 7/2003 | Gavan et al. ............. | 706/10 |
| 6,826,536 B1* | 11/2004 | Forman .................. | 705/4 |
| 7,251,624 B1* | 7/2007 | Lee et al. ............... | 705/35 |
| 7,813,944 B1* | 10/2010 | Luk et al. ............... | 705/4 |
| 2006/0074793 A1* | 4/2006 | Hibbert et al. .......... | 705/38 |
| 2007/0106582 A1* | 5/2007 | Baker et al. ............ | 705/35 |
| 2007/0174214 A1* | 7/2007 | Welsh et al. ........... | 705/405 |
| 2007/0203732 A1* | 8/2007 | Griegel et al. ......... | 705/1 |
| 2008/0046334 A1* | 2/2008 | Lee et al. ............... | 705/26 |
| 2008/0140576 A1* | 6/2008 | Lewis et al. ........... | 705/67 |
| 2009/0222243 A1* | 9/2009 | Zoldi et al. ............ | 703/2 |
| 2009/0222369 A1* | 9/2009 | Zoldi et al. ............ | 705/35 |
| 2009/0271343 A1* | 10/2009 | Vaiciulis et al. ........ | 706/21 |

OTHER PUBLICATIONS

"EFD Debit Card Fraud Management" 2007 (http://fnfis.com/NR/RDONLYRES/2B9F6DBB-0402-4B17-9D74-F3D8254E0C64/0/R08_DBTCRDFRAUD.PDF).*
Fawcett et al. "Adaptive Fraud Detection" (1997) Data Mining and Knowledge Discovery, p. 291-316.*
Vovk et al. "Self-calibrating probability forecasting" (2003) http://vovk.net/kp.*
Neu et al. "Credit Risk Enhancement in a Network of Interdependent Firms" (2004) Department of Mathematics, King's College London, p. 1-17.*
Hastie et al., "The Elements of Statistical Learning" Data Mining, Inference, and Prediction, Springer Series in Statistics, Second Edition, Aug. 2008, pp. 1-758.
Tierney, Luke "A Space-Efficient Recursive Procedure For Estimating A Quantile Of An Unknown Distribution" Siam J. Sci. Stat. Comput.; vol. 4, No. 4, Dec. 1983.

* cited by examiner

*Primary Examiner* — Scott L Jarrett
*Assistant Examiner* — Sujay Koneru
(74) *Attorney, Agent, or Firm* — Mintz, Levin, Cohn, Ferris, Glovsky and Popeo, P.C.

(57) ABSTRACT

A system and method for detecting fraud is presented. A self-calibrating outlier model is hosted by a computing system. The self-calibrating outlier model receives transaction data representing transactions, and is configured to calculate transaction-based variables, profiles and calibration parameters, and to produce a score based on the transaction data according to the transaction-based variables, profiles and calibration parameters. An adaptive cascade model is also hosted by the computing system, and is configured to generate a secondary score for the transaction data based on profile information from the variables and/or profiles calculated by the self-calibrating outlier model, and based on a comparison with labeled transactions from a human analyst of historical transaction data.

14 Claims, 5 Drawing Sheets

SELF-CALIBRATING OUTLIER MODEL AND ADAPTIVE CASCADE MODEL FOR FRAUD DETECTION

FIELD

This disclosure relates generally to fraud detection and, more particularly, to an adaptive outlier model for more rapid and effective fraud detection.

BACKGROUND

Traditional fraud modeling relies on collecting large amounts of labeled historical data to build and test, with human supervision, statistical models. The fundamental assumption is that the fraudulent and normal patterns of the past will be largely consistent in the future. This supervised modeling approach has been extremely successful in building fraud detection models for which the historical data was of good quality and generalized well to future customer behavior.

However, there are many scenarios in which this traditional modeling approach is not feasible or poorly suited. Often a situation arises in which historical data from clients is not available, or the contributed historical data is of low quality: In these cases, a more appropriate choice than a traditional model is an unsupervised model which utilizes self-calibrating analytics to track the production environment.

Another situation is a changing fraud environment which causes model performance to degrade faster than expected between model retrains. A fraud feedback loop providing fraud detection information from the client directly into the model allows the model to update weights and adapt to a changing fraud environment.

SUMMARY

The subject matter disclosed herein provides methods and apparatus, including computer program products, for an analytic technique that combines a self-calibrating outlier model with an adaptive cascade model. By doing this, a fraud model can be built that has less dependency on historical data for training and has the capability to learn the changing fraud patterns in production.

In one aspect there is provided a system for detecting fraud. The system includes a self-calibrating outlier model hosted by a computing system. The self-calibrating outlier model receives transaction data representing transactions, and is configured to calculate transaction-based variables, profiles and calibration parameters, and to produce a score based on the transaction data according to the transaction-based variables, profiles and calibration parameters. The system further includes an adaptive cascade model hosted by the computing system. The adaptive cascade model is configured to generate a secondary score for the transaction data based on profile information from the variables and/or profiles calculated by the self-calibrating outlier model, and based on a comparison with labeled transactions from a human analyst of historical transaction data.

In another aspect, a system for detecting fraud includes an adaptive cascade model that is configured to access fraud/non-fraud tables related to online real-time gathered historical transaction data to produce a secondary score for new transaction data. The secondary score is based on the fraud/non-fraud tables combined with profile information of the new transaction data generated from a self-calibrating outlier model that produces a baseline score. In this aspect, the system further includes a score fusion component that generates a final score as a function of the baseline score from the self-calibrating outlier model and the secondary score from the adaptive cascade model.

In yet another aspect, a method for detecting fraud in a transaction includes the steps of receiving, at a self-calibrating outlier model hosted by a computing system, transaction data representing the transaction, and calculating, by the computing system operating the self-calibrating outlier model, transaction-based variables, profiles and calibration parameters. The method further includes generating, by the self-calibrating outlier model, a baseline score for the transaction according to the transaction-based variables, profiles and calibration parameters, and generating, by an adaptive cascade model hosted by the computing system, a secondary score for the transaction based on profile information from the profiles calculated by the self-calibrating outlier model, and based on a comparison with labeled transactions from a human analyst of historical transaction data.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

The subject matter described herein relates to a system and method for more reliable detection of fraud in transactions. The system and method include an adaptive cascade model that accesses labeled production transaction data in fraud/non-fraud tables that are updated on line to update its fraud detection parameters used in conjunction with a self-calibrating outlier model. The system and method using the combined outlier model with adaptive cascade model (herein referred to as an "adaptive outlier model") can provide fraud models to clients without historical data, and capture changing fraud patterns in a production environment. The system and method can also provide rapid fraud solution deployment while working to collect historical data for traditional model development.

Figure 1:
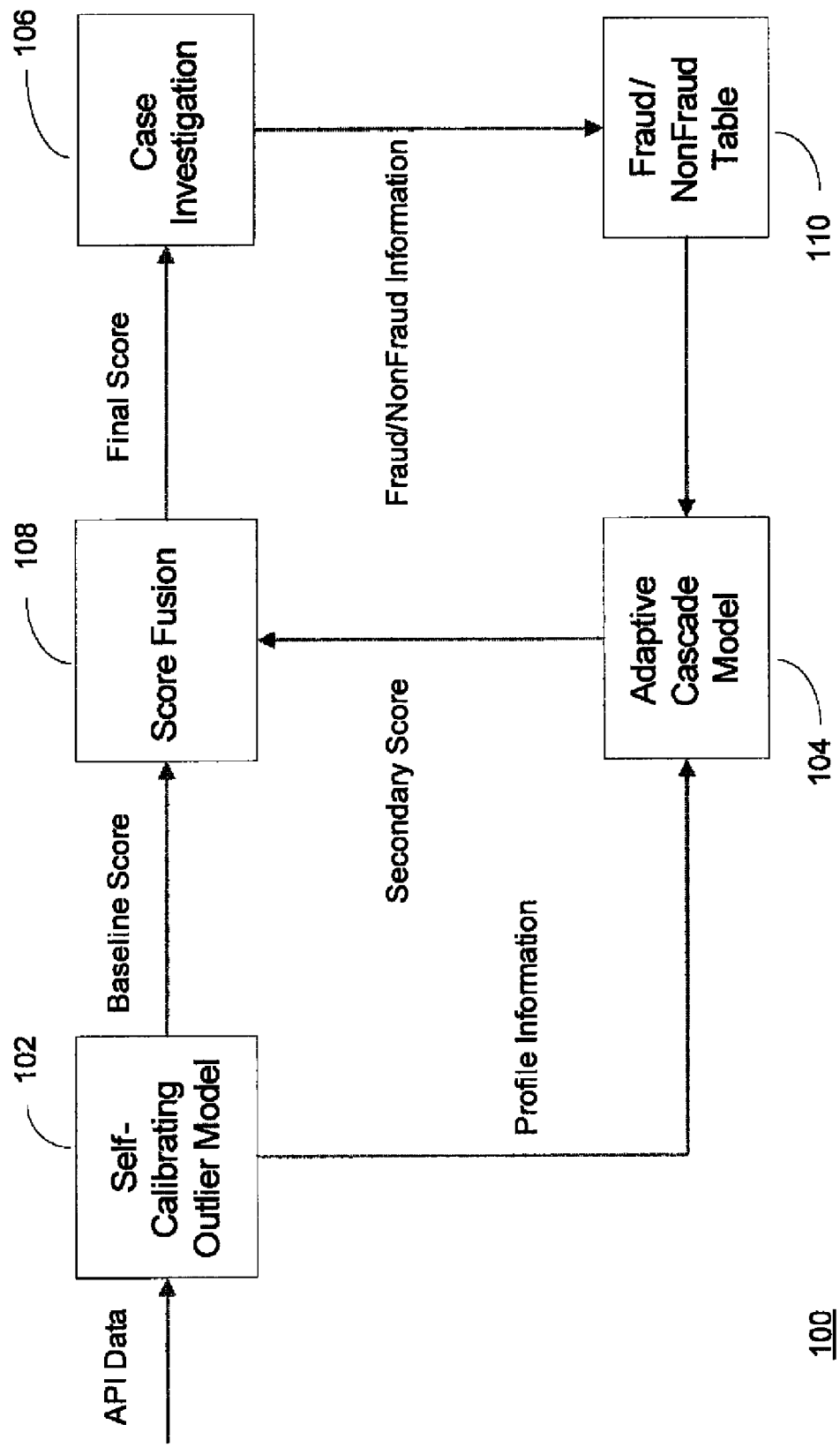
FIG. 1 illustrates an adaptive outlier model system for detecting fraud by processing transaction data.

In accordance with exemplary implementations, FIG. 1 illustrates an adaptive outlier model 100, which includes a baseline, self-calibrating outlier model 102 and an adaptive cascade model 104. The self-calibrating outlier model 102 accepts incoming transaction data, updates profiles, calculates model variables, updates calibration parameters and produces a score. The profiles, variables and score are sent to the adaptive cascade model 104 as profile information, and the adaptive cascade model 104 produces a secondary score based on labeled transactions from a case investigation system 106. A score fusion component 108 combines scores from the baseline, self-calibrating outlier model 102 and adaptive cascade model 104 and sends scores together with transaction data to the case investigation system 106. The case investigation system 106 sends an analyst's decision (e.g. whether a transaction is fraud or normal activity) to a database, along with scores, variables and profile information associated with the transaction data, to create fraud and non-fraud tables 110. The adaptive cascade model 104 accesses the fraud and non-fraud tables 110 to update its fraud detection parameters.

The final score $S_f$ is a function of baseline score $S_b$ from the self-calibrating outlier model and secondary score $S_c$ from the adaptive cascade model:

$$S_f = f(S_b, S_c)$$

Baseline, Self-Calibrating Outlier Model

The baseline model has the capability to calibrate itself in a production environment which can circumvent the problem of lack of historical data and make rapid deployment possible. This calibration is related to the determination of severity of anomaly of specific fraud feature variables. For the purpose of outlier detection, we usually want to fit a model in the form of:

$$S_b = \sum_{i=1}^{p} w_i q(x_i \mid \theta)$$

given its associated parameter $(\theta_1, \ldots, \theta_l) \in \theta$ where l is total number of parameters. Here $S_b$ is the transaction score, a linearly weighted (with the weights $w_i$) sum of p transformed predictive profile variables $(x_1, \ldots, x_p) \in X$. The transformation performed by the self-calibrating outlier model is a scaling process across all model variables:

$$q(x_i \mid \theta) \equiv \frac{x_i - \theta_1}{\theta_2} \in [0, C]$$

where $(\theta_1, \theta_2) \in \theta$ are location and scale parameters respectively. The scaled value has a lower bound of 0 so that each individual variable only contributes positively to the score when its value is greater than $\theta_1$. The upper bound is some constant C to limit a single variable's effect and avoid dominating other variables' contribution.

The self-calibration functionality of the baseline model comes from the capability of estimating the scaling parameters $(\theta_1, \theta_2) \in \theta$ based on the transaction data in a client's production environment after the model is installed. The assumption is that if the weights $w_i$ can operate well on a scale that can be correctly established, then this model should be applicable to different operating environments. A more general version of $q(x_i | \theta)$ is as follows:

$$q(x_i \mid \theta) = \frac{x_i - \theta_P}{(\theta_s - \theta_r)/c} \in [0, C]$$

where $\theta_p$ denotes the value of the p-th percentile for the variable $x_i$ and c is a pre-defined tuning constant to control the effect of the inter-percentile range on the scaled variable. In some implementations of fraud applications, the following parameters can be preset as: p=r=95, s=99, c=6, and C=6 identically across all model variables.

The iterative algorithm to calculate the quantiles ($\theta_{95}$ and $\theta_{99}$) is provided as follows. At step n, the r-th quantile estimate $\bar{\theta}_n^r$ of variable x can be obtained as:

$$\bar{\theta}_n^r = \bar{\theta}_{n-1}^r + k_n \frac{r - \sum_{i=1}^{M} 1\{x_n^i \leq \bar{\theta}_{n-1}^r\}/M}{e_{n-1}}$$

Where:

$$k_n = \begin{cases} 1/n, & \text{if } n < N \\ 1/N, & \text{if } n \geq N \end{cases}$$

N: A design parameter which is usually a large number to maintain a minimum step size.

$e_n = \max\{f_n, f_0/\sqrt{n}\}$ and $f_0$ is the initial value of $f_n$

M: The number of observations during each update and $M \geq 1$ $f_n$: A density estimate for the variable x at the r-th percentile using the following equation:

$$f_n = (1 - w_n)f_{n-1} + w_n \frac{\sum_{i=1}^{M} 1\{|x_n^i - \bar{\theta}_{n-1}^r| \leq c_n\}}{2c_n M}$$

where $c_n = 1/\sqrt{n}$

By setting up a cap, the learning rate of the algorithm $k_n$ can be kept above a certain level such that the algorithm will be responsive to the change of underlying probabilistic distribution. By assigning a large number to N, the capped learning rate $k_n$ (where $n \geq N$) will still be small such that possible oscillation around the target quantile value will be minimized.

Overall, the baseline outlier model can calibrate itself to the production environment and produce a fraud score $S_b$ as a basic measurement on the fraud risk of each transaction. The weights associated with the fraud score can be obtained by different approaches, including but not limited to, training based on a consortium data set which is a combination of data sets from different clients in the same industry, a uniform weighting, and a combination of domain knowledge and customer input of how to combine the set of outlier values that are computed as outlined above.

The baseline self-calibrating outlier model can produce a baseline score $S_b$ to reflect the likelihood of fraud for each transaction by calibrating itself to the data stream in a production environment. To make the model responsive to the fraud trends in a real time production environment, an adaptive cascade model is added to the self-calibrating baseline model to incorporate fraud information from the client's case investigations.

Some advantages in adding the cascade model include the feedback loop helping the whole model track the changing fraud pattern when fraud information from the client's case investigation is accurate and timely. Also, if the feedback data is unreliable, the unmodified base score is available and unaffected by errors in the feedback. Further, the cascade model requires only minor additions to the base model thus not extending the base model preparation time.

As it has been mentioned before, the secondary score from the adaptive secondary is calculated by combining profiles, variables and score from baseline model with fraud information from clients' case investigation. Implementations of adaptive cascade model include parametric and non-parametric models. One instance of doing that is a nearest neighbor approach: For a transaction cur, the secondary score $S_c$ can be obtained as:

$$S_c(cur) = \alpha \left[ \prod_{i \in (n,u)} Dist_{nonfraud}(i, cur) - \prod_{j \in (m,u)} Dist_{fraud}(j, cur) \right]$$

Where:
$\alpha > 0$ is a constant to adjust the score $$\prod_{i \in (n,u)} (.)$$

is an operator which will search among all its n possible input values (in this case distances) and find the mean value among the u smallest ones.

n: Number of records in the non-fraud table
m: Number of records in the fraud table
u: Number of entries from table with the smallest distance to the current transaction. These entries are used to compute a mean value. u=10 in our implementation.
Dist(p,q): A function measuring the distance between two transactions p and q. Assuming the baseline model contains profile variables $v_1, v_2, \ldots, v_M$; an instance of using Euclidean distance function between these two transactions is:

$$Dist(p, q) = \sqrt{\sum_{i=1}^{M} \beta_i (v_i^p - v_i^q)^2}$$

In the above equation, if the first term (mean distance to non-fraud transactions) is larger than the second term (mean distance to fraud transactions), the secondary score $S_c$ would make positive contribution to the final score $S_f$. This is logical since it means the current transaction is "closer" to production fraud profiles than production non-fraud profiles and thus merits a higher score.

Figure 2:
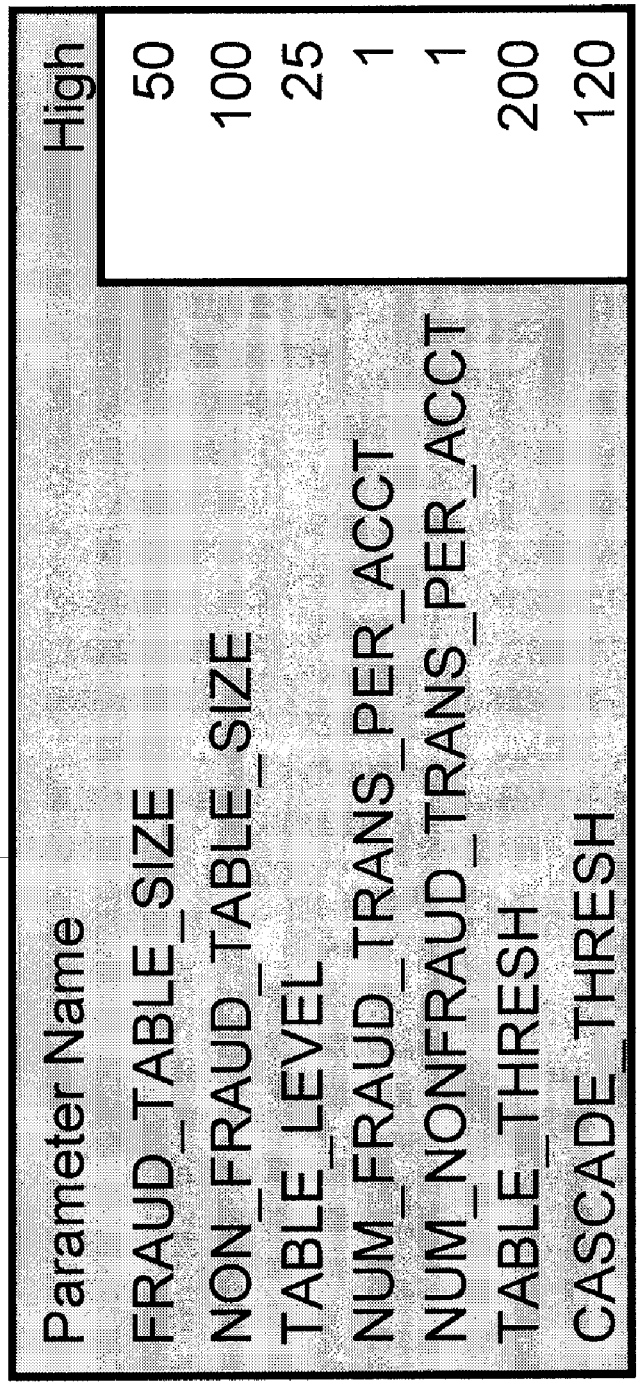
FIG. 2 is a table illustrating key parameters for an adaptive outlier model system and method and an instance of one implementation.

FIG. 2 illustrates some key parameters used in some implementations of a self learning outlier model. Some key parameters are generally as follows:

FRAUD/NON_FRAUD_TABLE_SIZE: Measure of number of fraud or non-fraud profiles contained in the table. Since there are many more non-fraud profiles than fraud profiles, the NON_FRAUD_TABLE_SIZE is usually larger than FRAUD_TABLE_SIZE TABLE_LEVEL: Percentage the fraud and non-fraud tables must be filled before scoring NUMBER_FRAUD/NON_FRAUD_TRANS_PER_ACCT: Number of fraud/non-fraud records per account allowed in the table TABLE_THRESH: Score threshold to be exceeded before record is allowed in the table.

CASCADE_THRESH: Baseline score threshold to be exceeded before cascade model is applied to the record.

All these parameters are for simulation purposes only, and can be adjusted in production according to each client's needs. Since a fraud model's performance is usually measured at the high score range, the adaptive cascade model only operates on transactions with a base score above CASCADE_THRESH and only trains on transactions above TABLE_THRESH. The vast majority of transactions have scores lower than TABLE_THRESH and of little interest to the client since a low score represents a low likelihood of fraud.

Score Fusion

In exemplary implementations, the final score $S_f$ is a function of baseline score $S_b$ and secondary score $S_c$ $$S_f = \begin{cases} 1, & \text{if } S_b + S_c < 1 \\ 999, & \text{if } S_b + S_c > 999 \\ S_b + S_c, & \text{otherwise} \end{cases}$$

Figure 3:
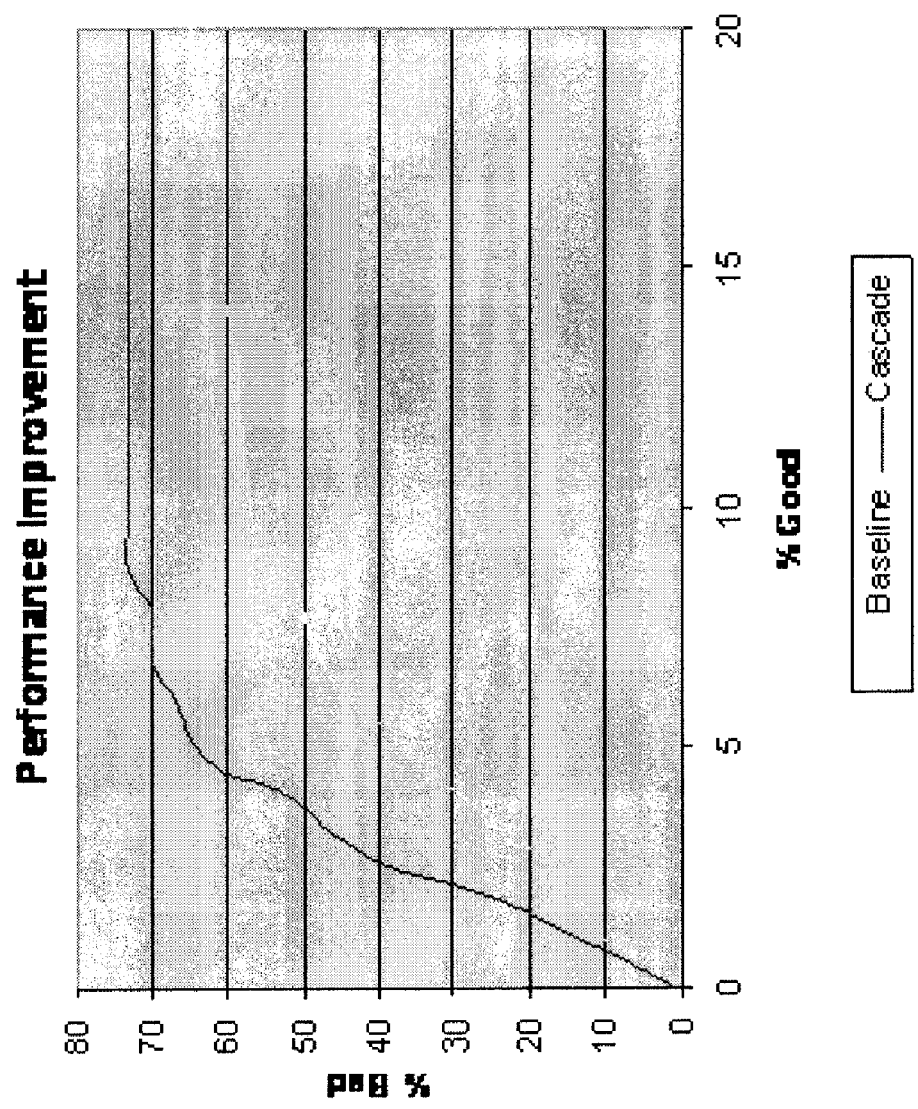
FIG. 3 illustrates performance improvement results for a telecommunications technical fraud data set.

FIG. 3 illustrates, for a telecommunications technical fraud data set, that the adaptive cascade model provides significant fraud detection performance improvement over the baseline self-calibrating outlier model. A given point in the curve corresponds to an operation point in production. Its x coordinate and y coordinate represent percentage of non fraud and fraud transactions it covers. The higher the curve, the more fraud transactions the system can detect.

Figure 4:
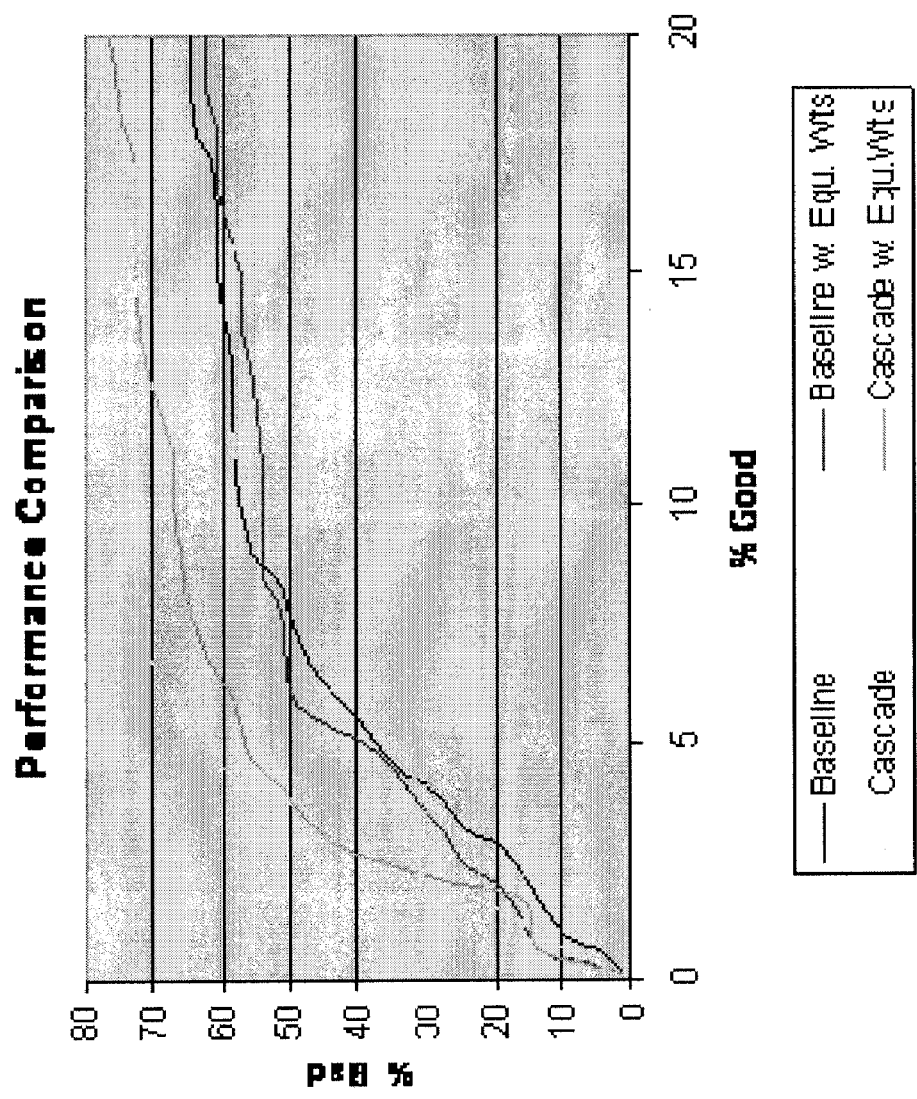
FIG. 4 illustrates a comparison of four different configurations of an adaptive outlier system and method.

In FIG. 4, four different configurations are compared: baseline model, untrained baseline model (weights of variables are set to be equal 'uniform weighting'), baseline model with cascade model and untrained baseline model plus cascade model. The cascade model is shown to be capable of substantially improving the model of both a tuned self-calibrating baseline outlier model and a 'uniformly weighted' self-calibrating baseline model. The incorporation of fraud/non-fraud feedback in production allows a more optimal weighting of the individual outlier values (based on the self-calibrating outlier model) to result in a higher model performance by tracking fraud behaviors in the production environment where the model is deployed.

Figure 5:
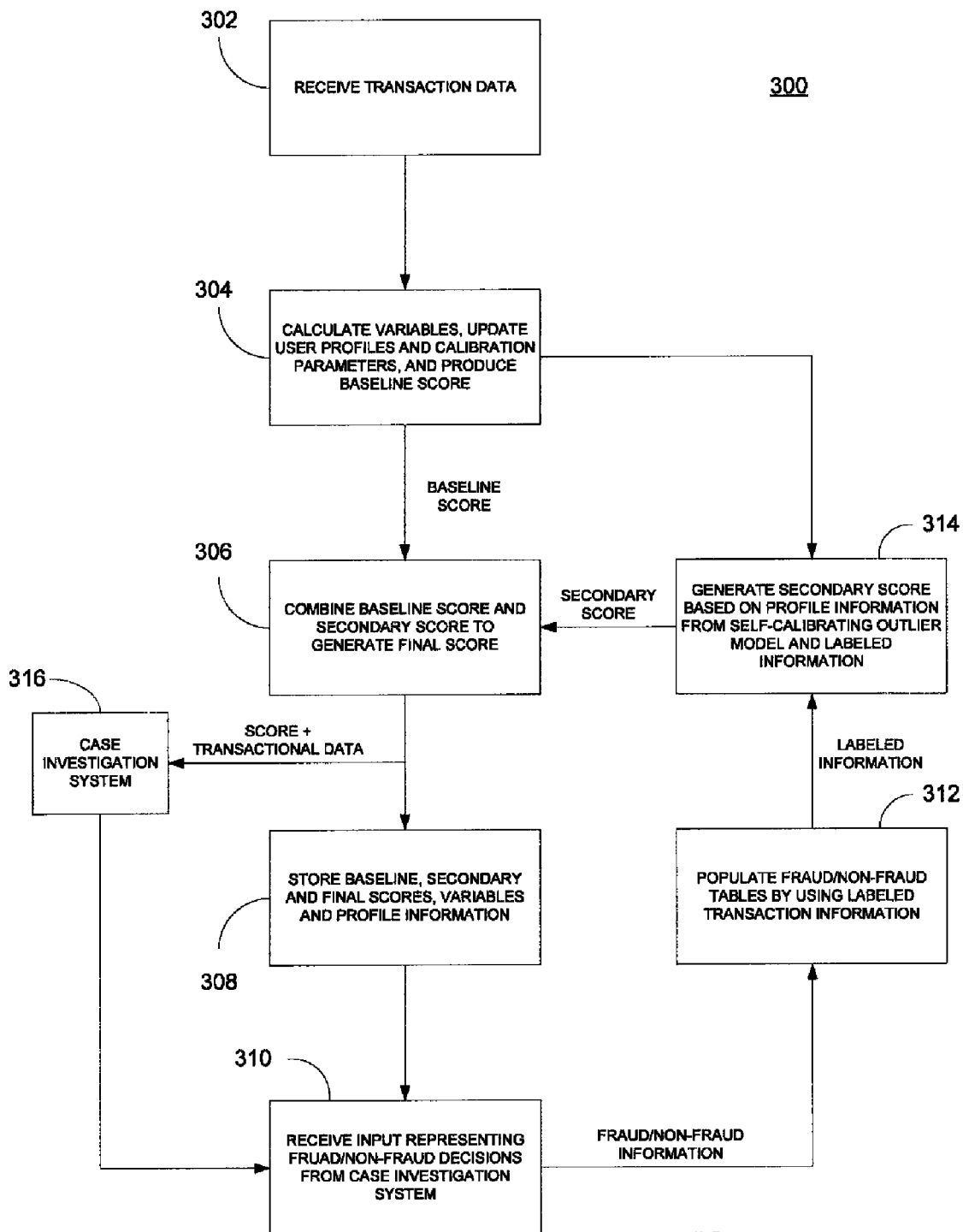
FIG. 5 illustrates a method for detecting fraud using an adaptive outlier model.

FIG. 5 illustrates a method 300 for detecting fraud in transactions such as financial transactions or information exchange transactions between two or more parties. A party can be a human, an automated logic system such as a computer, or a combination thereof. At 302, transaction data is received, preferably over a communication medium into a computing system. For example, the transaction data can be transmitted over a wireless communication medium, wired communication medium or combination thereof, according to any of a number of known communication standards and protocols. The computing system can be a single computing platform or multiple computing platforms connected together in a network.

At 304, fraud detection variables and user profiles related to parties associated with the transaction data are calculated or determined, preferably by a self-calibrating outlier model. The self-calibrating outlier model, which is preferably hosted by the computing system, also calculates calibration parameters, which, with the variables and user profiles, are used as a basis for producing a baseline score for each transaction represented by the received transaction data, substantially as described above.

At 306, the baseline score is received by a score fusion component of the computing system, along with a secondary score, preferably produced from an adaptive cascade model as described in further detail below, and a final score for the transaction data is generated. At 308, the score fusion component provides the baseline score, secondary score, and final score, along with transaction data, to a case investigation system. The case investigation system includes a computing system with a display or printer, or other output device, which computing system, display or output device is accessible and operable by a human analyst. The human analyst reviews all relevant information and scores about selected transactions, and renders a decision as to whether individual selected transactions are fraudulent or not (i.e. to generate fraud/non-fraud information). At 312, the fraud/non-fraud information is used to populate fraud/non-fraud tables for storage in a database in a format that can be accessible as "labeled information" to other components of the computing system, such as the adaptive cascade model.

At 314, preferably by the adaptive cascade model, a secondary score is generated based on profile information from step 304, i.e. from the self-calibrating outlier model, for instance, and the labeled information. As described above, the secondary score is provided to the score fusion component where it is combined with the baseline score for iterative enhancement to generate a final score, which can also be output to an output device, at 316. The output device for delivering the final score can be a display, a printer, or another computing device connected by a communication medium.

As described herein, the adaptive outlier model includes a baseline self-calibrating outlier model which can calibrate itself based on variable distributions observed in a production environment and an adaptive cascade model which would modify the baseline score according to real time fraud and non-fraud cases worked in the production environment. By combining the two models, a viable fraud solution for challenging situations including a lack of historical data or rapidly changing fraud trends is presented.

The proposed scheme also provides flexibility in model building since a set of suboptimal weights can still provide decent model performance as the model is allowed to learn in production based on fraud and non-fraud cases being worked. This can be important where data is insufficient for good estimation of initial weights for the baseline model.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A system for detecting fraud, the system comprising:
a self-calibrating outlier model hosted by a computing system, the self-calibrating outlier model receiving transaction data representing transactions, and being configured to calculate transaction-based variables, profiles and calibration parameters, and to produce a baseline score based on the transaction data according to the transaction-based variables, profiles and calibration parameters; and
an adaptive cascade model hosted by the computing system, the adaptive cascade model being configured to generate a secondary score for the transaction data based on profile information from the variables and/or profiles calculated by the self-calibrating outlier model, and based on a comparison with labeled transactions from a human analyst of historical transaction data;
wherein the self-calibrating outlier model takes a form of:

$$S_b = \sum_{i=1}^{p} w_i q(x_i \mid \theta)$$

given its associated parameter $(\theta_1, \ldots, \theta_l) \in \Theta$, where l is total number of parameters, $S_b$ is a transaction score based on a linearly weighted sum, with the weights $w_i$, of p transformed predictive profile variables $(x_1, \ldots, x_p) \in X$, wherein $q(x_i \mid \Theta)$ is a scaled value of corresponding profile variable $x_i$.

2. The system in accordance with claim 1, further comprising a score fusion component hosted by the computing system, the score fusion component adapted to combine the baseline score and secondary score into a final score.

3. The system in accordance with claim 2, further comprising:
   a communication medium connected to the computing system; and
   a case investigation system, hosted by a second computing system, the case investigation system adapted to provide a human analyst with the final score, the baseline score, the secondary score, related to the transaction data, and adapted to receive an indication from the human analyst whether a transaction related to the transaction data is fraud or non-fraud.

4. The system in accordance with claim 3, further comprising:
   a table generator generating a fraud/non-fraud table of a history of transactions related to the transaction data; and
   a database for storing the fraud/non-fraud table as labeled information.

5. The system in accordance with claim 4, wherein the adaptive cascade model hosted on the computing system is adapted to receive the labeled information from the database.

6. The system in accordance with claim 5, wherein the database is hosted by the computing system.

7. The system in accordance with claim 2, wherein the final score is a function of the baseline score from the self-calibrating outlier model and the secondary score from the adaptive cascade model.

8. A method for detecting fraud in a transaction, the method comprising:
   receiving, at a self-calibrating outlier model hosted by a computing system, transaction data representing the transaction;
   calculating, by the computing system operating the self-calibrating outlier model, transaction-based variables, profiles and calibration parameters;
   generating, by the self-calibrating outlier model, a baseline score for the transaction according to the transaction-based variables, profiles and calibration parameters; and
   generating, by an adaptive cascade model hosted by the computing system, a secondary score for the transaction based on profile information from the profiles and variables calculated by the self-calibrating outlier model, and based on a comparison with labeled transactions from a human analyst of historical transaction data,
   the self-calibrating outlier model taking a form of:

$$S_b = \sum_{i=1}^{p} w_i q(x_i \mid \theta)$$

given its associated parameter $(\theta_1, \ldots, \theta_l) \in \theta$, where l is total number of parameters $S_b$ is a transaction score based on a linearly weighted sum, with the weights $w_i$, of p transformed predictive profile variables $(x_1, \ldots, x_p) \in X$, wherein $q(x_i \mid \ominus)$ is a scaled value of corresponding profile variable $x_i$.

9. A method as in claim 8, wherein a transformation performed by the self-calibrating outlier model is a scaling process across all model variables, the scaling process being used to obtain the scaled value $q(x_i \mid \ominus)$ such that:

$$q(x_i \mid \theta) \equiv \frac{x_i - \theta_1}{\theta_2} \in [0, C]$$

where $(\theta_1, \theta_2) \in \theta$ are location and scale parameters respectively, where C is an upper bound constant.

10. A method as in claim 8, wherein a transformation performed by the self-calibrating outlier model is a scaling process across all model variables, the scaling process being used to obtain the scaled value $q(x_i \mid \ominus)$ such that:

$$q(x_i \mid \theta) = \frac{x_i - \theta_p}{(\theta_s - \theta_r)/c} \in [0, C]$$

where $\theta_p$ denotes a value of a p-th percentile for the variable $x_i$ and c is a pre-defined tuning constant to control an effect of an inter-percentile range on a scaled variable.

11. A method as in claim 10, wherein an iterative algorithm to calculate quantiles ($\theta_{95}$ and $\theta_{99}$) is provided as follows:
   at step n, an r-th quantile estimate $\overline{\theta}_n^r$ of variable x is obtained as:

$$\overline{\theta}_n^r = \overline{\theta}_{n-1}^r + k_n \frac{r - \sum_{i=1}^{M} 1\{x_n^i \le \overline{\theta}_{n-1}^r\}/M}{e_{n-1}}$$

where:

$$k_n = \begin{cases} 1/n, & \text{if } n < N \\ 1/N, & \text{if } n \ge N \end{cases}$$

N: A design parameter which is usually a large number to maintain a minimum step size $e_n = \max\{f_n, f_0/\sqrt{n}\}$ and $f_0$ is the initial value of $f_n$ M: The number of observations during each update and $M \ge 1$ $f_n$: A density estimate for the variable x at the r-th percentile using the following equation:

$$f_n = (1 - w_n) f_{n-1} + w_n \frac{\sum_{i=1}^{M} 1\{|x_n^i - \overline{\theta}_{n-1}^r| \le c_n\}}{2 c_n M}$$

where $c_n = 1/\sqrt{n}$.

12. A method as in claim 8, wherein the secondary score is generated using a nearest neighbor approach.

13. A method as in claim 12, wherein the nearest neighbor approach provides: for a transaction cur, the secondary score $S_c$ can be obtained as:

$$S_c(cur) = \alpha \left[ \prod_{i \in (n,u)} Dist_{nonfraud}(i, cur) - \prod_{j \in (m,u)} Dist_{fraud}(j, cur) \right]$$

where:

α>0 is a constant to adjust the secondary score, $$\prod_{i\in(n,u)}$$

(.) is an operator which will search among all its n possible input values (in this case distances) and find the mean value among the u smallest ones, n: Number of records in a non-fraud table, m: Number of records in a fraud table, u: Number of entries from table with smallest distance to a current transaction, Dist(p,q): A function measuring a distance between two transactions p and q, i: a number corresponding to one of the two transactions associated with the Dist(p,q) function associated with non-fraud transactions, the number i having n possible values, and j: a number corresponding to one of the two transactions associated with the Dist(p,q) function associated with fraud transactions, the number j having m possible values.

14. A method as in claim 13, wherein the self-calibrating outlier model contains profile variables $v_1, v_2, \ldots, v_M$; and wherein a Euclidean distance function between these two transactions is provided as:

$$Dist(p, q) = \sqrt{\sum_{i=1}^{M} \beta_i (v_i^p - v_i^q)^2}.$$

* * * * *